(12) United States Patent
Takeda et al.

(10) Patent No.: US 6,699,590 B2
(45) Date of Patent: Mar. 2, 2004

(54) HOT-DIP GALVANIZED STEEL SHEET (75) Inventors: Hiroyuki Takeda, Kobe (JP); Kouki Ikeda, Kobe (JP); Ikurou Hashimoto, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 13 days.

(21) Appl. No.: 10/118,961

(22) Filed: Apr. 10, 2002

(65) Prior Publication Data

US 2002/0160221 A1 Oct. 31, 2002

(30) Foreign Application Priority Data

Apr. 25, 2001 (JP) ........................... 2001-128175

(51) Int. Cl.$^7$ ................. B32B 15/18; C23C 2/02; C23C 2/06
(52) U.S. Cl. ................. 428/629; 428/659; 428/939; 427/433; 205/193; 148/518; 148/533; 148/537
(58) Field of Search ................. 428/659, 629, 428/939; 427/433; 205/193; 148/518, 533, 537

(56) References Cited

U.S. PATENT DOCUMENTS

| | | | |
|---|---|---|---|
| 5,326,648 A | 7/1994 | Kato et al. | 428/610 |
| 5,447,802 A | 9/1995 | Tobiyama et al. | 428/610 |
| 5,882,803 A | 3/1999 | Seto et al. | 428/659 |
| 6,342,310 B2 | 1/2002 | Hashimoto et al. | 428/459 |

FOREIGN PATENT DOCUMENTS

| | | |
|---|---|---|
| JP | 4-173924 | 6/1992 |
| JP | 4-173925 | 6/1992 |
| JP | 04-280925 | * 10/1992 |
| JP | 5-112830 | 5/1993 |
| JP | 5-132740 | 5/1993 |
| JP | 5-140653 | 6/1993 |
| JP | 5-279829 | 10/1993 |
| JP | 06-240365 | * 8/1994 |
| JP | 7-11410 | 1/1995 |
| JP | 7-316842 | 12/1995 |
| JP | 2618308 | 3/1997 |
| JP | 3142922 | 12/2000 |
| JP | 2001-288550 | * 10/2001 |

* cited by examiner

Primary Examiner—John J. Zimmerman
(74) Attorney, Agent, or Firm—Oblon, Spivak, McClelland, Maier & Neustadt, P.C.

(57) ABSTRACT

An object of the present invention is to provide a hot-dip galvanized steel sheet which is excellent in adhesion with a hot-dip galvanized zinc layer, and has high tensile strength and good formability even when a steel sheet containing Si and Mn in relatively larger amounts is used as a basis steel sheet. The hot-dip galvanized steel sheet is composed of: a basis steel sheet containing Si in an amount of 0.05 to 2.5% and Mn in an amount of 0.2 to 3%, by mass; a Fe plated layer formed on the basis steel sheet; and a hot-dip galvanized zinc layer formed on the surface layer of the basis steel sheet via the Fe plated layer, wherein oxides containing Si and/or Mn are discontinuously dispersed in the vicinity of the interface between the basis steel sheet and the Fe plated layer.

14 Claims, 6 Drawing Sheets

HOT-DIP GALVANIZED STEEL SHEET

BACKGROUND OF THE INVENTION

1. Field of the Invention

The present invention relates to a hot-dip galvanized steel sheet to be used as a corrosion preventive steel sheet for automobiles, or the like. More particularly, the present invention relates to a hot-dip galvanized steel sheet which has ensured both of good plating adhesion and good formability. Incidentally, the term "hot-dip galvanized steel sheet" used in the present invention embraces not only ordinary ones carrying the zinc layer in the as-plated state but also so-called hot-dip galvannealed steel sheets which have undergone a heat treatment for alloying after galvanizing (to form the zinc layer on the basis material).

2. Description of the Related Art

There is an increasing demand for improvement in fuel consumption rate as a part of the policy for preventing the global warming due to $CO_2$ discharge. To this end, a new target for improved fuel consumption has been set up and a new tax system has been introduced in favor of cars with improved fuel economy. One effective way of improving fuel consumption rate is by reduction of body weight. Achieving this object requires the raw material to have higher tensile strength than before. This is also the case with hot-dip galvanized steel sheets. For hot-dip galvanized steel sheets to have both high tensile strength and good formability, the basis material (steel sheet) should be incorporated with such elements as C, Si, and Mn.

Incidentally, for a hot-dip galvanized steel sheet, hot-dip galvanizing may be preceded by Fe electroplating (below, simply referred to as Fe plating) as preliminary plating (pre-plating), and then a step of annealing in a reducing atmosphere, with the aim of reducing the effect on the basis steel sheet, and the like. However, it has been observed as follows. If the steel sheet contains Si and Mn as chemical components for achieving higher tensile strength, these chemical components diffuse and concentrate onto the Fe plated layer surface due to heating during annealing. Accordingly, respective oxides or complex oxides (below, both the oxides will be simply referred to as oxides) of Si and Mn which are easily oxidizable elements, are yielded on the Fe plated layer surface due to the oxygen inevitably occurring in the atmosphere, although it is the reducing atmosphere. Unfavorably, when the hot-dip galvanized steel sheet is formed, peeling or the like occurs in the vicinity of the interface between the oxide layer and the hot-dip galvanized zinc layer (below, simply referred to as a Zn plated layer) due to the inferior adhesion between the oxide layer and the Zn plated layer.

Therefore, for manufacturing a hot-dip galvanized high tensile strength steel sheet, it is essential that the layer of Si and Mn oxides as described above should not be formed on the Fe plated layer surface. Various studies have been conducted from such a viewpoint. For example, Japanese Patent Publication No. 2618308 discloses the following method. In the method, a 0.001 to 1 μm-thick mixed layer of $Fe_2SiO_4$ and $SiO_2$ is formed at the lower part of the Fe plated layer to inhibit formation of Fe and Si oxide film detrimental to the platability on the Fe plated layer surface.

However, the inventors' investigation has revealed that the foregoing method improves the adhesion of the Zn plated layer with reliability, but there is still room for improvement in terms of formability.

SUMMARY OF THE INVENTION

Under such circumstances, the present invention has been completed. It is therefore an object of the present invention to provide a hot-dip galvanized steel sheet having good formability by improving the adhesion between the basis steel sheet surface and a hot-dip galvanized zinc layer in a hot-dip galvanized high tensile strength steel sheet containing Si and/or Mn.

A hot-dip galvanized steel sheet of the present invention, which has attained the foregoing object, is composed of: a basis steel sheet containing Si in an amount of 0.05 to 2.5% and Mn in an amount of 0.2 to 3%, by mass; a Fe plated layer formed on the basis steel sheet; and a hot-dip galvanized zinc layer formed on the surface layer of the basis steel sheet via the Fe plated layer. The hot-dip galvanized steel sheet is characterized in that the oxides containing Si and/or Mn are discontinuously dispersed in the vicinity of the interface between the basis steel sheet and the Fe plated layer. By positively forming the oxides of Si and/or Mn in the vicinity of the interface between the basis steel sheet surface and the Fe plated layer, it is possible to reduce the amount of Si and/or Mn which may diffuse and concentrate onto the Fe plated layer surface during annealing after Fe plating. As a result, the adhesion with the hot-dip galvanized zinc layer is improved. Further, if the hard oxides are formed in laminar structure, peeling occurs at the interface between the oxide layer and the adjacent layers. For this reason, the formability is improved by discontinuously dispersing the oxides therein.

The state in which the oxides of Si and/or Mn are discontinuously dispersed denotes the following state. Namely, upon observation of how the oxides containing Si and/or Mn occur in a region of dimensions of 1 μm or more by 1 μm or more in a perpendicular cross section including the vicinity of the interface between the basis steel sheet and the Fe plated layer under a transmission electron microscope at a magnification of 50000, even if a line segment with a length of 600 nm is drawn at any position in the field of vision of observation, the length of the portion in which the line segment and the oxides containing Si and/or Mn overlap with each other does not exceed 480 nm. Further, if the preferred embodiments of the present invention are prescribed in terms of the size of each oxide containing Si and/or Mn, the major axis length of the oxide is preferably 400 nm or less.

Incidentally, as the oxides containing Si and/or Mn, $SiO_2$ and $Mn_2SiO_4$ are conceivable, but other elements may be contained therein. Therefore, in the present invention, the oxides denote the moieties in which Si and/or Mn and O are detected at the same time upon EDS (energy-dispersive X-ray spectrometer) analysis in observation under a transmission electron microscope.

It is preferable that the basis steel sheet in the vicinity of the oxides containing Si and/or Mn contains Si and/or Mn in the form of solid solution in an amount of 80 mass % or less of the amount of Si and/or Mn in the composition of the basis steel sheet. Namely, the oxides are formed as a result of enrichment of Si and/or Mn in the form of solid solution in the peripheral basis steel sheet. Therefore, in the basis steel sheet in the vicinity of the oxides, the amount of Si and Mn in the form of solid solution is reduced. From such a viewpoint, the amount of Si and/or Mn in the form of solid solution has been prescribed as described above.

DETAILED DESCRIPTION OF THE PREFERRED EMBODIMENTS

As described above, the annealing for reduction following Fe electroplating is performed in an atmosphere which does not oxidize Fe but oxidizes Si and Mn which are easily oxidizable elements. Accordingly, annealing causes these elements in a basis steel sheet to diffuse and concentrate onto the Fe plated layer surface. As a result, a Si-containing oxide and a Mn-containing oxide (below, referred to as Si/Mn oxides) which are poor in adhesion with the succeeding hot-dip galvanized zinc layer is formed on the Fe plated layer surface.

The present inventors aimed as follows. The Si/Mn oxides are prevented from being formed on the surface of the Fe electroplated layer upon annealing for reduction. In consequence, the state in which metallic Fe excellent in wettability with molten zinc exists on the surface is held, resulting in good platablity. Then, the present inventors succeeded in preventing Si and Mn from concentrating on the surface of the Fe plated layer by previously forming the Si/Mn oxides in the vicinity of the basis steel sheet surface during annealing for reduction following Fe electroplating. Further, the present inventors also found out the following fact. Namely, if the grains of the Si/Mn oxides are combined to be coarse grains, cracks and peeling off of the plated layer are caused upon formation. Therefore, these oxides are required to be dispersed. Thus, the present invention was completed. Below, the present invention will be described in detail.

A hot-dip galvanized steel sheet of the present invention is composed of: a basis steel sheet containing Si in an amount of 0.05 to 2.5% and Mn in an amount of 0.2 to 3%, by mass; a Fe plated layer formed on the basis steel sheet; and a hot-dip galvanized zinc layer formed on the surface layer of the basis steel sheet via the Fe plated layer, wherein the oxides containing Si and/or Mn are discontinuously dispersed in the vicinity of the interface between the basis steel sheet and the Fe plated layer.

In the vicinity of the interface between the basis steel sheet surface and the Fe plated layer, Si and Mn are positively formed into oxides. In consequence, even if Si and Mn partially diffuse upon annealing following Fe plating, most of Si and Mn cannot diffuse and concentrate onto the Fe plated layer surface as atoms. This eliminates the possibility that the oxides are formed on the Fe plated layer surface to inhibit the wettability with the hot-dip galvanized zinc layer.

The Si/Mn oxides should be discontinuously dispersed. The wording "to be discontinuously dispersed" denotes "not to be in laminar form, but to be granular matters in dispersed form". When the oxides are in laminar form, or when some oxides become more coarse to a size of more than 480 nm, the formability undesirably deteriorates.

When the degree of discontinuous dispersion of the oxides is observed in an actual hot-dip galvanized steel sheet, the hot-dip galvanized steel sheet of the present invention satisfies the following condition: "upon observation of how the oxides containing Si and/or Mn occur in a region of dimensions of 1 μm or more by 1 μm or more in a perpendicular cross section including the vicinity of the interface between the basis steel sheet and the Fe plated layer under a transmission electron microscope at a magnification of 50000, even if a line segment with a length of 600 nm is drawn at any position in the field of vision of observation, the length of the portion in which the line segment and the oxides containing Si and/or Mn overlap with each other does not exceed 480 nm."

In the present invention, fine Si/Mn oxides are formed in dispersed state in the vicinity of the interface between the basis steel sheet and the Fe plated layer. For this reason, the perpendicular cross section of the hot-dip galvanized steel sheet is observed under a transmission electron microscope (TEM) capable of observing these fine Si/Mn oxides. The observed region is set to extend 1 μm or more in the direction of thickness and 1 μm or more in the direction of plane, of the steel sheet. The observation magnification is set to be 50000. If the cross section in the vicinity of the interface between the basis steel sheet and the Fe plated layer is observed under these conditions, the state in which the oxides are dispersed in the field of vision is observed.

Figure 1:
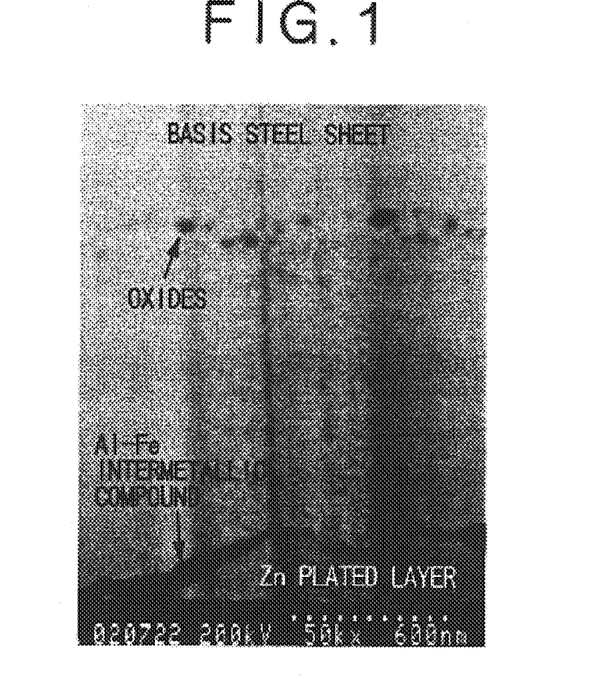
FIG. 1 is a micrograph substituted for a drawing showing the transmission electron microscope observation result of the perpendicular cross section of a hot-dip galvanized steel sheet obtained in accordance with Example 2.
Figure 2:
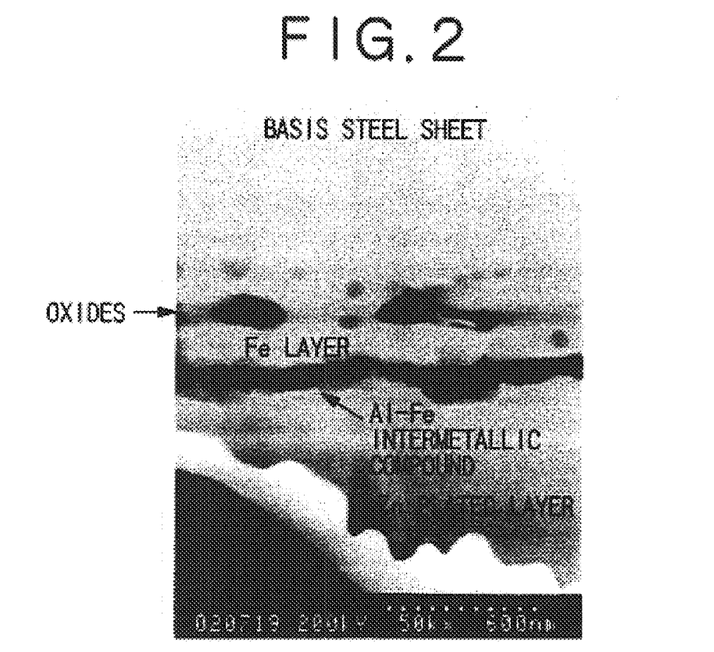
FIG. 2 is a micrograph substituted for a drawing showing the transmission electron microscope observation result of the perpendicular cross section of a hot-dip galvanized steel sheet obtained in accordance with Comparative Example 1.

For example, FIG. 1 shows the TEM observation result (micrograph substituted for a drawing) of the example of the present invention, wherein it is observable that granular oxides are dispersed. Whereas, FIG. 2 shows the TEM observation result (micrograph substituted for a drawing) of the comparative example described later, wherein more coarse oxides are observable. In FIG. 1, even if a line segment with a length of 600 nm indicated by dotted lines is disposed at any position in the field of vision of observation, the length of the portion in which the line segment with a length of 600 nm and the oxides overlap with each other will not exceed 480 nm. However, in FIG. 2, if the line segment with a length of 600 nm is disposed so as to overlap with the more coarse oxides, the length of the portion in which the line segment with a length of 600 nm and the oxides overlap with each other exceeds 480 nm.

Under such circumstances, the condition that "even if a line segment with a length of 600 nm is drawn at any position in the field of vision of observation, the length of the portion in which the line segment and the oxides containing Si and/or Mn overlap with each other does not exceed 480 nm" has been prescribed as the requirement for "the degree of dispersion of the oxides". Needless to say, the line segment may be drawn in any directions.

In terms of the size of one oxide, the foregoing requirement denotes that the major axis length thereof is 480 nm or less. However, the major axis length is more preferably 400 nm or less. This is attributable to the fact that the detrimental effect on the formability becomes less significant as the major axis length decreases. Whereas, also when a large number of Si/Mn oxides with a major axis length not exceeding 480 nm are present in proximity to one another, unfavorably, it is impossible to implement the plating adhesion improvement and the formability improvement as intended in the present invention if the length of the portion in which the oxides and the line segment overlap with each other exceeds 480 nm.

As the Si/Mn oxides, i.e., the oxides containing Si and/or Mn, other than $SiO_2$ and $Mn_2SiO_4$, complex oxides with other elements such as Fe may be formed. Therefore, in the present invention, when the EDS (energy-dispersive X-ray spectrometer) analysis was conducted in TEM observation, the portion in which Si and O, Mn and O, or Si, Mn, and O had been detected simultaneously was regarded as oxides. The EDS analysis is desirably performed under the conditions of a beam diameter of 5 to 20 nm and a sample thickness of 100 nm.

Figure 3:
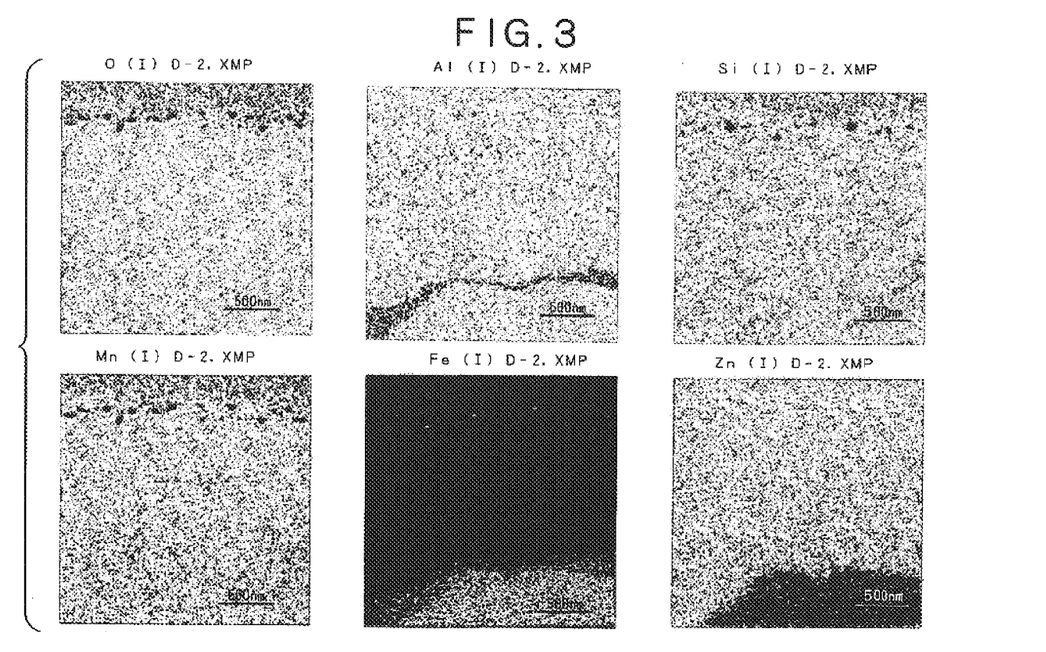
FIG. 3 are diagrams showing the analysis results by means of an energy dispersive X-ray spectrometer (EDS) in the observation region of FIG. 1.

FIG. 3 show the respective EDS analysis results for O (upper left column), Al (upper middle column), Si (upper right column), Mn (lower left column), Fe (lower middle column), and Zn (lower right column) in the field of vision of observation of FIG. 1. The portions in black granular form when the diagrams of respective analysis results for O and Si, and O and Mn are overlaid one on another, respectively, denotes the oxides. The basis steel sheet (having a higher concentration of Si and Mn than that of the Fe plated layer) is on the upper side of the portion in which the oxides are present, and the Fe plated layer is on the lower side thereof. This indicates that the oxides occur in the vicinity of the interface therebetween. Whereas, from the analysis results for Fe and Zn, it is shown that the Fe plated layer is present between the hot-dip galvanized zinc layer and the basis steel sheet. Incidentally, Al has been added to a hot-dip galvanizing bath for forming an Al—Fe intermetallic compound at the interface between the hot-dip galvanized zinc layer and the Fe plated layer, and preventing alloying of Zn and Fe. The Al—Fe intermetallic compounds are present in the Al enriched portions, or as shown in FIG. 1, between the Fe plated layer and the hot-dip galvanized zinc layer.

Figure 4:
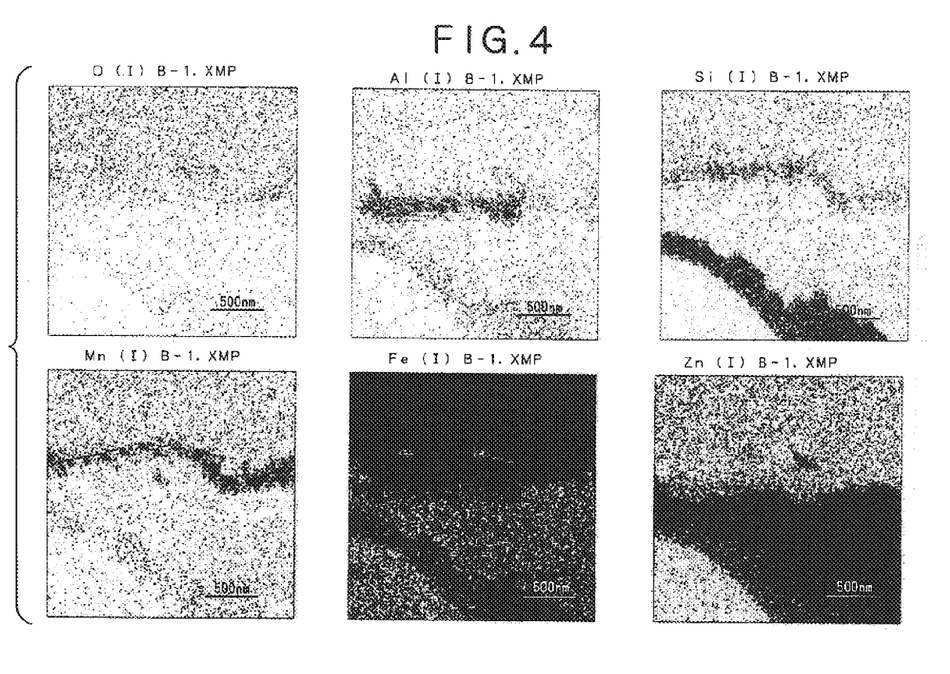
FIG. 4 are diagrams showing the analysis results by means of an energy dispersive X-ray spectrometer (EDS) in the observation region of FIG. 2.

FIG. 4 show the respective EDS analysis results for O (upper left column), Al (upper middle column), Si (upper right column), Mn (lower left column), Fe (lower middle column), and Zn (lower right column) in the field of vision of observation of FIG. 2 (Comparative Example). It is shown that Si and Mn are connected to each other in laminar form as compared with FIG. 3.

In the present invention, fine Si/Mn oxides are positively formed in the vicinity of the interface between the basis steel sheet and the Fe plated layer. Accordingly, free Si or Mn which may diffuse and move to the Fe plated layer surface is reduced in amount to prevent the formation of the Si/Mn oxides on the Fe plated layer surface. Namely, the Si/Mn oxides are formed as a result of enrichment of Si and/or Mn in the form of solid solution in the peripheral basis steel sheet. Therefore, in the basis steel sheet surrounding the formed Si/Mn oxides, the amount of free Si and Mn forming solid solution should be reduced. For this reason, it has been prescribed that the amount of Si and/or Mn in the form of solid solution in the basis steel sheet in the vicinity of the oxides containing Si and/or Mn is 80 mass % of the amount of Si and/or Mn in the composition of the basis steel sheet. The amount of Si in the form of solid solution and the amount of Mn in the form of solid solution in the basis steel sheet around the oxides can be determined by, for example, line analysis or area analysis with EDS analysis.

Figure 5:
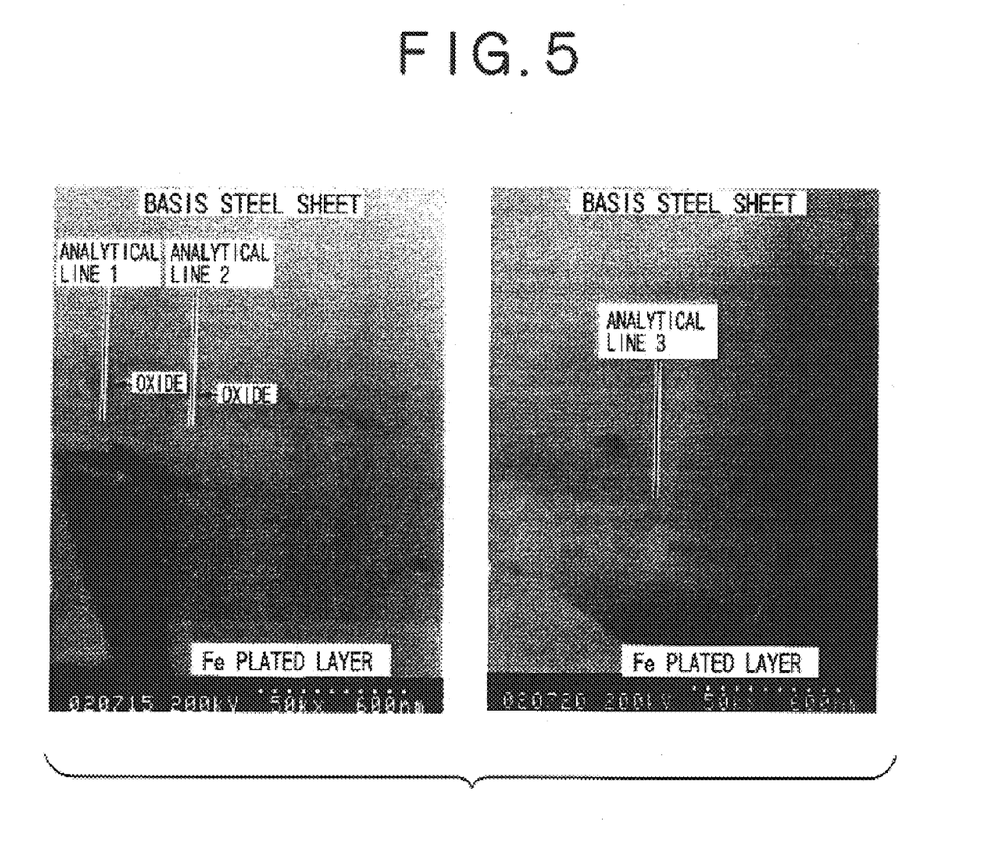
FIG. 5 are micrographs substituted for drawings showing the transmission electron microscope observation results of the perpendicular cross sections of hot-dip galvanized steel sheet samples obtained in accordance with Example 1.
Figure 6:
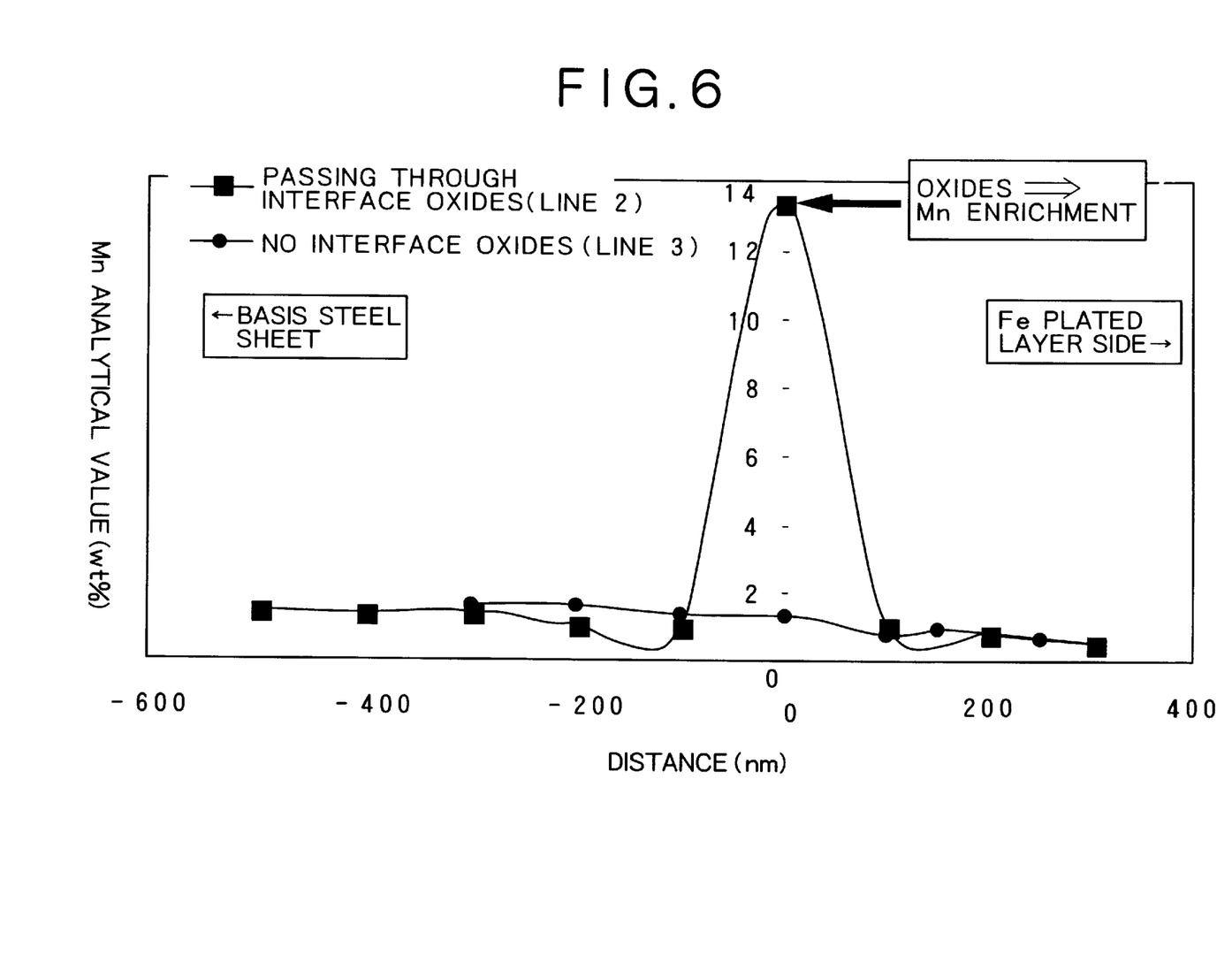
FIG. 6 is a graph showing the Mn concentration of each of the analytical lines 2 and 3 in FIG. 5.

FIG. 5 are the TEM observation results (micrographs substituted for drawings) of the example of the present invention, showing analytical lines for analyzing the Mn amount. FIG. 6 shows the result thereof. Analytical lines 1 and 2 are the lines passing through the oxides. An analytical line 3 is a line passing through the portion of the basis steel sheet in which no oxide is present. In FIG. 6, the point at a distance of 0 is the point in the analytical line 2 at which the oxides are present. Whereas, the distance of 0 has no meaning for the analytical line 3.

From FIG. 6, it is shown that, in the analytical line 2 (-■-), the Mn concentration of the portion in which the oxides are present is very high (13.49 mass %). Further, it is also shown that the Mn concentration of the portion ranging from +200 nm to −300 nm from the point in which the oxides are present is apparently lower than that of the portion of +200 nm or more, or −300 nm or more. Incidentally, the Mn concentration at −400 nm is 1.37 mass %, and the Mn concentration at −200 nm is 0.99 mass %. Therefore, it is indicated that the Mn concentration is reduced to 0.99/1.37= 72.3% at the concentration reduction portion, assuming that the Mn concentration at −400 nm is the concentration of Mn in the composition of the basis steel sheet. On the other hand, in the analytical line 3 (-●-) passing through the oxide-free portion of FIG. 3, the concentration of Mn shows almost no change. The reason for this is as follows. No oxide is present in the surroundings, so that enrichment of Mn is not caused. In consequence, the concentration reduction does not occur, either. Incidentally, also for Si, the same result can be obtained.

Then, a description will be given to a preferred method for generating the fine Si/Mn oxides heretofore described in the vicinity of the interface between the basis steel sheet and the Fe plated layer. In general, the basis steel sheet is subjected to an acid cleaning treatment for removing the oxide of Fe and the like, prior to Fe plating. For obtaining the steel sheet of the present invention, only the following procedure is required. Namely, the acid cleaning treatment is not carried out, and Fe electroplating is carried out under the conventional conditions. Subsequently, annealing for reduction under the conventional conditions is carried out. Namely, an oxygen source is allowed to be present on the basis steel sheet surface during the Fe electroplating. In consequence, the Si/Mn oxides are formed under an atmosphere for annealing for reduction after Fe plating. Although the reason for this is not apparent, the fine Si/Mn oxides are formed in dispersed state with this method.

The basis steel sheet used in the present invention contains Si and Mn as basic components. The content of the basic components has no lower limit from the standpoint of platability because Si and Mn are harmful to plating; however, the steel sheet should contain 0.05 mass % or more of Si and 0.2 mass % or more of Mn so that it has high strength and good formability. The contents of Si and Mn should be 2.5 mass % or less and 3 mass % or less, respectively, because these elements in an excess amount adversely affect the formability. As for Si, the more preferred lower limit is 0.5 mass %, the more preferred upper limit is 2.0 mass %, the still more preferred upper limit is 1.8 mass %, and the most preferred upper limit is 1.5 mass %. As for Mn, the more preferred lower limit is 1.0 mass %, the more preferred upper limit is 2.6 mass %, the still more preferred upper limit is 2.0 mass %, and the most preferred upper limit is 1.6 mass %. Whereas, for carbon (C), the content is preferably in the range of 0.03 to 0.30 mass % in terms of strength. As for C, the more preferred lower limit is 0.05 mass %, and the more preferred upper limit is 0.20 mass %.

As components other than Si, Mn, and C described above, the basis steel sheet used in the present invention may contain, if required, various elements such as Ti, Nb, Mo, V, Zr, N, and B, other than basic components such as Al, P, and S. Their content is not specifically restricted so long as it is within the ordinary range for the basis steel sheet. Moreover, the steel sheet used in the present invention may contain trace elements having no effect on its characteristic properties. Such a steel sheet may be included in the basis steel sheet used in the present invention. The basis steel sheet usable in the present invention is not specifically restricted in thickness. The one having a thickness of about 0.6 to 3.0 mm is generally used as the hot-dip galvanized steel sheet. If the present invention is applied to the steel sheet with such a thickness, desirable results as demonstrated in Examples given later will be produced.

EXAMPLES

The present invention will be described in more detail by way of the following Examples, which should not be construed as limiting the scope of the present invention. Any changes made in carrying out the invention without departing from the gists of the present invention are included in the technical range of the present invention. It is noted that "%" denotes "mass %" in the following Examples.

Example 1

A cold rolled steel sheet containing 1.2% Si and 1.6% Mn was used as a basis steel sheet, and dipped in a 5% NaOH aqueous solution for the degreasing treatment. After washing with water, the acid cleaning treatment was not carried out, and Fe electroplating was carried out by using a sulfuric acid bath with a pH of 2 containing $Fe^{2+}$ in an amount of 1.4 mol/L so that the coating weight was 10 $g/m^2$. Subsequently, a heat treatment at 840° C. for 100 seconds was carried out in a reducing atmosphere containing 3% hydrogen. Then, the steel sheet was dipped in a hot-dip galvanizing bath with a bath temperature of 450° C. containing Al in an amount of 0.10 mass %. Thereafter, the steel sheet was subjected to an alloying treatment at 450° C. for 60 seconds, and air-cooled to room temperature to obtain a hot-dip galvanized steel sheet.

The thus obtained hot-dip galvanized steel sheet samples were visually rated for the adhesion of the hot-dip galvanized zinc layer thereof. Those samples free of bare spots are indicated by the mark O, and those samples with bare spots are indicated by the mark X.

Whereas, the samples were rated for the formability by an impact test. In accordance with the impact test, each hot-dip galvanized steel sheet sample was mounted on a doughnut-shaped jig perforated with a 16 mm-dia hole. Thus, the sample was rated for how the hot-dip galvanized zinc layer peeled off when struck with a hammer having a hemispherical end portion with a diameter of 12 mm and a height of 5 mm. The results are shown as follows: those samples in each of which peeling has not occurred are indicated by the mark ○, and those samples in each of which peeling has occurred are indicated by the mark X.

The examples shown in FIG. 5 described above are for the hot-dip galvanized steel sheet obtained in Example 1. The photograph observation was conducted by means of a field emission transmission electron microscope equipped with an energy-dispersive X-ray spectrometer [HF2000 from Hitachi Ltd.], and the EDS analysis was carried out with an acceleration voltage of 200 kV and an electron beam diameter of about 20 nm.

Example 2

A hot-dip galvanized steel sheet was manufactured in the same manner as in Example 1, except that the amount of Al contained in the hot-dip galvanizing bath was changed into 0.17 mass %. Incidentally, in this example, an alloying treatment was not carried out. The hot-dip galvanized steel sheet thus obtained was good in both the adhesion and the formability as indicated by the mark ○. It is noted that FIGS. 1 and 3 are for the hot-dip galvanized steel sheet obtained in Example 2.

Comparative Example 1

The same cold rolled steel sheet as that of Example 1 was degreased, washed with water, and dried. Subsequently, the steel sheet was subjected to an oxidation treatment at 700° C. for 20 seconds in air. Then, Fe plating was not carried out, and a heat treatment at 840° C. for 100 seconds was carried out in a reducing atmosphere containing 3% hydrogen. Then, the steel sheet was dipped in a hot-dip galvanizing bath with a bath temperature of 450° C. containing Al in an amount of 0.17 mass %. Thereafter, without conducting an alloying treatment, the steel sheet was air-cooled to room temperature to obtain a hot-dip galvanized steel sheet. The steel sheet sample obtained in Comparative Example 1 was rated for the adhesion of the hot-dip galvanized zinc layer and the formability thereof in the same manner as in Example 1. The plating adhesion was as indicated by the mark ○, but the formability was as indicated by the mark X. FIG. 2 is the micrograph of the cross section of the sample of this comparative example. The coarse Si/Mn oxides are observed, indicating that the formability is inferior due to the presence thereof.

Comparative Example 2

Figure 7:
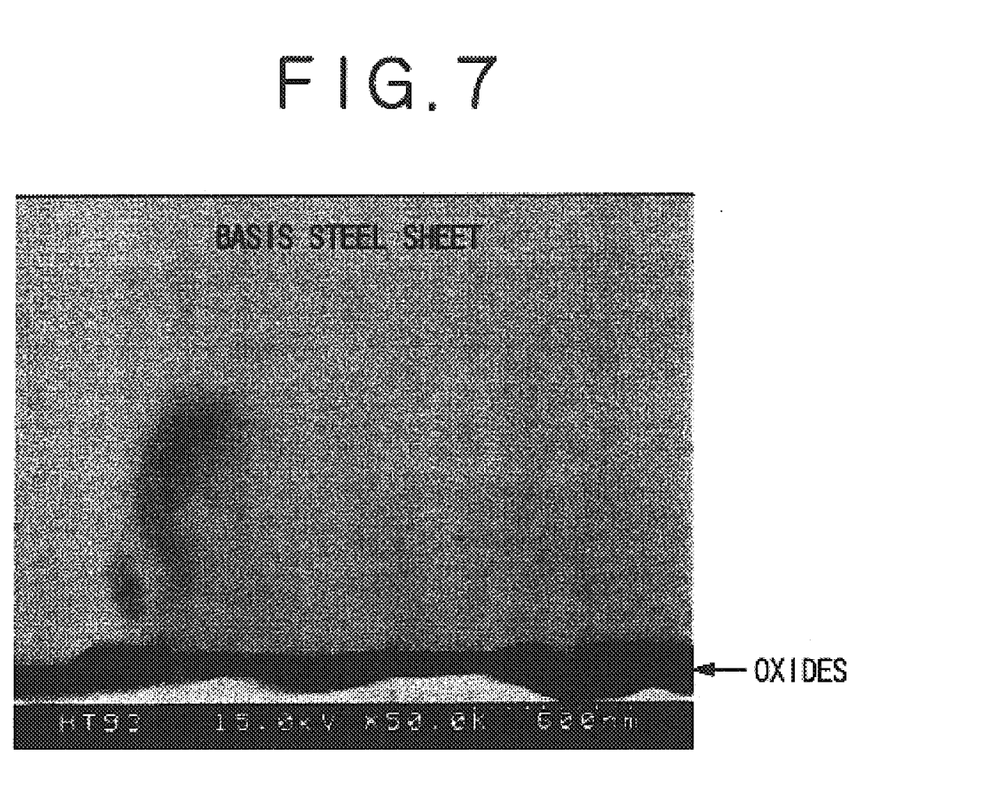
FIG. 7 is a micrograph substituted for a drawing showing the transmission electron microscope observation result of the perpendicular cross section of a steel sheet obtained in accordance with Comparative Example 2.

An attempt was made to perform hot-dip galvanizing in the same manner as in Example 1, except that Fe plating was not carried out. However, since layers of oxides of Mn and Si were formed on the basis steel sheet surface, the wettability with the hot-dip galvanizing bath was inferior. In consequence, Zn was not coated thereon at all. Incidentally, since no hot-dip galvanized zinc layer was formed, the steel sheet was not rated for the formability. FIG. 7 shows the TEM observation cross section micrograph of the obtained steel sheet. It is shown that the oxides are formed in laminar form.

The present invention is constituted as described above. By discontinuously dispersing fine Si/Mn oxides in a high tensile strength steel sheet containing Si and Mn in relatively larger amounts, it is possible to provide a hot-dip galvanized steel sheet excellent in the adhesion with the hot-dip galvanized zinc layer and the formability.

What is claimed is:

1. A hot-dip galvanized steel sheet, comprising:
   a basis steel sheet containing Si in an amount of 0.05 to 2.5% and Mn in an amount of 0.2 to 3%, by mass;
   a Fe plated layer formed on the basis steel sheet; and
   a hot-dip galvanized zinc layer formed on the surface layer of the basis steel sheet via the Fe plated layer,
   wherein oxides containing Si and/or Mn are discontinuously dispersed in the vicinity of the interface between the basis steel sheet and the Fe plated layer.

2. A hot-dip galvanized steel sheet, comprising:
   a basis steel sheet containing Si in an amount of 0.05 to 2.5% and Mn in an amount of 0.2 to 3%, by mass;
   a Fe plated layer formed on the basis steel sheet; and
   a hot-dip galvanized zinc layer formed on the surface layer of the basis steel sheet via the Fe plated layer,
   wherein upon observation of how the oxides containing Si and/or Mn occur in a region of dimensions of 1 µm or more by 1 μm or more in a perpendicular cross section including the vicinity of the interface between the basis steel sheet and the Fe plated layer under a transmission electron microscope at a magnification of 50000, even if a line segment with a length of 600 nm is drawn at any position in the field of vision of observation, the length of the portion in which the line segment and the oxides containing Si and/or Mn overlap with each other does not exceed 480 nm.

3. The hot-dip galvanized steel sheet according to claim 2, wherein the major axis length of each of the oxides containing Si and/or Mn is 400 nm or less.

4. The hot-dip galvanized steel sheet according to claim 2, wherein the basis steel sheet in the vicinity of the oxides containing Si and/or Mn contains Si and/or Mn in the form of solid solution in an amount of 80 mass % or less of the amount of Si and/or Mn in the composition of the basis steel sheet.

5. The hot-dip galvanized steel sheet according to claim 1, wherein the oxides containing Si and/or Mn are selected from the group consisting of $SiO_2$, $Mn_2SiO_4$ and oxides comprising Si, Mn and Fe.

6. The hot-dip galvanized steel sheet according to claim 2, wherein the oxides containing Si and/or Mn are selected from the group consisting of $SiO_2$, $Mn_2SiO_4$ and oxides comprising Si, Mn and Fe.

7. The hot-dip galvanized steel sheet according to claim 1, wherein the basis steel sheet contains the Si in an amount of 0.5 to 2.0%, by mass.

8. The hot-dip galvanized steel sheet according to claim 2, wherein the basis steel sheet contains the Si in an amount of 0.5 to 2.0%, by mass.

9. The hot-dip galvanized steel sheet according to claim 1, wherein the basis steel sheet contains the Mn in an amount of 1.0 to 2.6%, by mass.

10. The hot-dip galvanized steel sheet according to claim 2, wherein the basis steel sheet contains the Mn in an amount of 1.0 to 2.6%, by mass.

11. The hot-dip galvanized steel sheet according to claim 1, wherein the basis steel sheet further contains C in an amount of 0.03 to 0.30%, by mass.

12. The hot-dip galvanized steel sheet according to claim 2, wherein the basis steel sheet further contains C in an amount of 0.03 to 0.30%, by mass.

13. A method of making a hot-dip galvanized steel sheet, the method comprising
- electroplating Fe on a basis steel sheet to form a Fe plated steel sheet;
- hot-dip plating a zinc layer on the Fe plated steel sheet; and
- producing the sheet of claim 1, wherein
  - the basis steel sheet is not acid cleaned to remove Fe oxides prior to plating the Fe on the basis steel sheet.

14. A method of making a hot-dip galvanized steel sheet, the method comprising
- electroplating Fe on a basis steel sheet to form a Fe plated steel sheet;
- hot-dip plating a zinc layer on the Fe plated steel sheet; and
- producing the sheet of claim 2, wherein
  - the basis steel sheet is not acid cleaned to remove Fe oxides prior to plating the Fe on the basis steel sheet.

* * * * *

UNITED STATES PATENT AND TRADEMARK OFFICE
CERTIFICATE OF CORRECTION

PATENT NO.    : 6,699,590 B2  Page 1 of 1
DATED         : March 2, 2004
INVENTOR(S)   : Takeda et al.

It is certified that error appears in the above-identified patent and that said Letters Patent is hereby corrected as shown below:

<u>Title page,</u>
Item [73], should read: -- [73]    Assignee:    Kabushiki Kaisha Kobe Seiko Sho (Kobe Steel, Ltd.), Kobe (JP) --

Signed and Sealed this

Fourth Day of May, 2004

JON W. DUDAS
*Acting Director of the United States Patent and Trademark Office*